United States Patent Office 3,428,484
Patented Feb. 18, 1969

3,428,484
METHOD OF TREATING PAPER WITH ETHYL-ENIMINE DERIVATIVES USING A BORON TRIFLUORIDE-AMINE COMPLEX CATALYST
Duane L. Kenaga, Midland, Mich., assignor to The Dow Chemical Company, Midland, Mich., a corporation of Delaware
No Drawing. Filed Oct. 30, 1964, Ser. No. 407,894
The portion of the term of the patent subsequent to Apr. 4, 1984, has been disclaimed
U.S. Cl. 117—155     13 Claims
Int. Cl. D21h *3/36;* C09d *3/48*

ABSTRACT OF THE DISCLOSURE

Paper treated with ethylenimine derivatives and a boron trifluoride-amine complex in a substantially anhydrous system has improvement in one or more of the following characteristics: sizing, wet strength, dry strength, or flame-resistance.

---

This invention relates to an improved paper treating process. More particularly, the present invention relates to an improved method of treating paper with ethylenimine derivatives using a boron trifluoride-amine complex as a curing agent.

It is known that tris(1-aziridinyl)phosphine oxide (APO) may be used in preparing fire retardant cellulosic fabrics as disclosed in U.S. Patent 3,034,919 to Steinhauer. Polyethylenimine has also been used for paper treatment. Other U.S. patents dealing with the use of APO in fiber treatment formulations include U.S. 2,859,134 to Reeves et al. and U.S. 2,870,042 to Chance et al. A particular method for treating paper with APO and certain derivatives is disclosed in U.S. Patent 3,312,520.

It has now been found that uniform curing of paper which has been impregnated with an ethylenimine derivative can be achieved by contacting the impregnated paper with a boron trifluoride-amine complex and then curing the impregnated paper. The most convenient method of contacting the impregnated paper with the curing agent is to add the curing agent to the ethylenimine derivative prior to impregnating the paper with the treating composition. The curing agents used in the process of the invention perform almost no curing function until heat is applied. When heat is applied to the boron trifluoride-amine complex used in the process of the present invention, the complex decomposes and it is believed that the decomposition products (especially the $BF_3$ that is liberated) effect a cure of the impregnated paper by reacting with the aziridine rings of the ethylenimine derivatives. Thus, when the curing agents of the process of the present invention are used, both the rate and amount of cure can be precisely controlled to give a treated paper product of uniform quality.

As used herein, the term "paper" is meant to include cardboard, newspaper, brown utility paper and other foldable paper products derived from the kraft, sulfite, soda or other similar process.

The treatment process of this invention consistently results in improving one or more of the following characteristics of the treated paper: sizing (water repellency), wet strength, dry strength and/or flame-resistance. In addition, other desirable properties such as folding endurance may show improvement when repeated runs are compared using the boron trifluoride-amine complexes according to the method herein disclosed.

The boron trifluoride-amine complex is a molecular complex (at least one amine-nitrogen atom per amine molecule is complexed with at least one molecule of $BF_3$) and may be represented by the formula

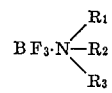

wherein A represents an amine (including polyamines) and $n$ represents an integer of from one to the maximum number of amine-nitrogen atoms in the amine A. Examples of suitable $BF_3 \cdot$amine complexes include molecular complex compounds of the formula

wherein each of $R_1$, $R_2$ and $R_3$ is selected from group consisting of the hydrogen atom, a lower hydroxyalkyl group of the formula $$HO{-}(C_kH_{2k}){-}$$

wherein $k$ is an integer of from 2 to 4 and a lower alkyl group of from 1 to 4 carbon atoms and wherein at least one of $R_1$, $R_2$ and $R_3$ is a lower alkyl group or a lower hydroxyalkyl group (i.e., not all of $R_1$, $R_2$ and $R_3$ are hydrogen atoms). Typical curing agents in this class thus include:

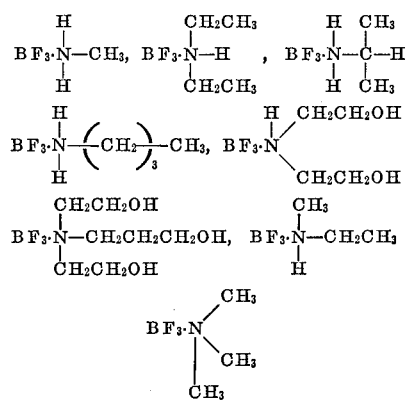

etc.

Complexes in which the amine (A) is a heterocyclic amine (such as piperidine, piperazine, morpholine, etc.) may also be used. Such complexes may be represented by the formula

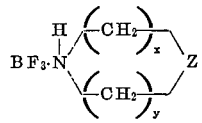

wherein $x$ and $y$ are each integers of from 1 to 3 and Z represents a methylene group, oxygen or an N—H group. When the amine moiety (A) is a heterocyclic tertiary amine, complexes such as

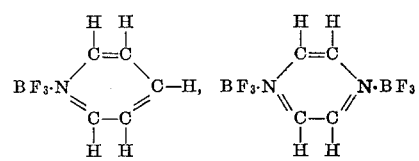

formed with pyridine and pyrazine, respectively, may be used. The only requirement of the boron trifluoride-amine complexes which are used as curing agents in the process of the invention is that the molecular complexes decompose at a temperature of from 50° to 250° C.

Complexes which decompose at temperatures of from 100° to 200° C. form a preferred subclass of curing agents. Other BF₃·amine complexes which may be used include

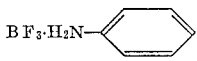

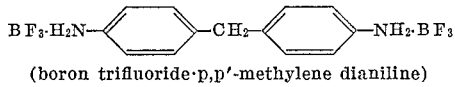

(boron trifluoride·p,p'-methylene dianiline)

and

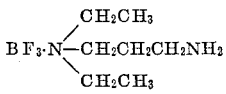

(boron trifluoride·diethylaminopropylamine)

The ethylenimine derivatives which may be employed in the process of the invention are activated aziridine compounds which contain at least one substituted or unsubstituted aziridine ring of the formula

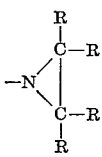

wherein R is hydrogen or a hydrocarbon of from 1 to 6 carbon atoms such as an aryl group, alkyl group, alkenyl, cycloalkyl or cycloalkenyl group. Since the physical and chemical modifications of the paper are achieved by the opening of the aziridine (or substituted aziridine) rings coupled with the combination of these opened rings with the cellulose molecules of the paper, any compound with an activated aziridine ring which may be cleaved by the BF₃·amine complex may be used in the process. The properties of the paper will vary with the particular ethylenimine derivative employed and will depend somewhat upon the other elements and structural groups within the molecule. Thus, when phosphorus or halogen atoms are present in the ethylenimine derivative compound, the cured paper product will have fire-resistant properties.

By "activated aziridine" compound as used herein is meant an aziridine compound which contains substituents attached directly to the aziridine nitrogen atom which are capable of stabilizing a negative charge which is formed on the aziridine nitrogen in the transition state when the compound reacts with a nucleophile. A particular class of such compounds include those which are characterized by the structure (which may be monovalent or divalent)

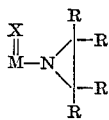

wherein R is as previously defined, M is a phosphorus or carbon atom and X represents a sulfur atom or an oxygen atom. Typical examples include 1-acetyl aziridine, ethyl aziridinyl formate and O-cyclohexyl-N,N-ethyleneurethane.

Since one of the main advantages of the process of the invention is to provide a means for controlling the curing step in order to obtain uniform results, it is desirable to eliminate other materials from the treating composition which might cause premature or partial curing of the composition by uncontrolled cleavage of the aziridine ring. Thus, it is preferable to use an inert solvent in preparing a treating bath. Since substances such as acids tend to open the aziridine ring, it is preferable that such substances be omitted from the treating composition. However, small amounts of acid or other ring-opening materials may nevertheless be present in the treating bath. Optimum results are obtained when these other conventional aziridine ring-opening reagents and/or polymerization catalysts are eliminated from the treating compositions. Examples of solvents which may be used include xylene, toluene, benzene, 1,1,1-trichloroethane, carbon tetrachloride, chloroform, ethylene dichloride, ethylene dibromide, perchloroethylene, trichloroethylene, chlorobenzenes, aliphatic naphthas, gasoline, aromatic mineral spirals, n-butane, n-pentane, isopentane, ethylbenzene and mixtures of such solvents.

In a preferred embodiment of the invention, a bath mixture is prepared containing from .2 to 10 percent by weight of an activated ethylenimine derivative and a catalytic amount (usually from .1 to 20.0 percent by weight based on the amount of aziridine compound) of boron trifluoride-amine complex dispersed or dissolved in a suitable inert (preferably substantially anhydrous) solvent or carrier. The paper which is to be treated is contacted with the bath by any suitable method (dipping, spraying, brushing, etc.) to form a product impregnated with the desired amount of activated ethylenimine derivative and catalyst. The impregnated paper product may be dried prior to curing or may be simultaneously dried and cured by the application of heat to the treated paper. The heat curing step may be carried out at temperatures of from about 50° to 250° C. Temperatures of from 100° to 150° C. are generally sufficient to cure most treated paper products in a time period of about four minutes.

The preferred activated ethylenimine derivatives which are used in the process are phosphine oxides or sulfides of the formula

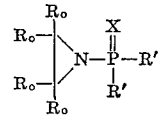

wherein X is an oxygen atom or a sulfur atom, each R₀ is independently selected from the group consisting of the hydrogen atom, a lower alkyl group of from 1 to 4 carbon atoms and the phenyl group and wherein each R' group is selected from the group consisting of

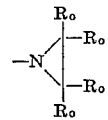

(each R₀ is as previously defined), a phenyl group and an alkoxy group of from 1 to 18 carbon atoms. Examples of such compounds include

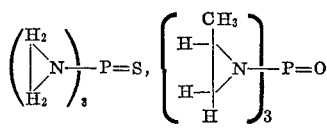

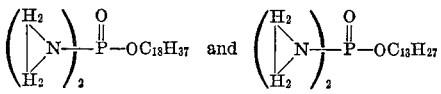

Other suitable compounds which may be used in the process of the invention are discolsed in U.S. Patents 2,606,901 and 2,606,902 to Parker et al., the disclosures of which are herein incorporated by reference.

The following examples are submitted for the purpose of illustration only and are not to be construed as limiting the scope of the invention in any way.

Example I

Preformed handsheet [dimensions 9" x 11"; TAPPI (Technical Association of the Pulp and Paper Industry) basis weight—70.3 grams/sq. meter] of Weyerhaeuser Regular (bleached) Kraft were dipped in treating baths containing 2.0 percent and 4.0 percent of tris(1-aziridinyl)phosphine oxide (APO) and an amount of $$BF_3 \cdot amine$$

complex equal to 9.0 percent $BF_3$ by weight based on the APO in the treating bath. The solvent was allowed to evaporate at room temperature and the impregnated sheet was placed between two cauls on top of a felt pad and cured in a laboratory press at temperatures of 90° C. or 120° C. (top platen temperature) for a time period of four minutes. The solvent used to prepare the bath was a mixture of 1,1,1-trichloroethane and methyl ethyl ketone (75:25 parts by volume, respectively). The catalyst $BF_3 \cdot DEAPA$ (diethylaminopropylamine) of Runs 5 and 6 was not soluble in this carrier. All catalysts of Runs 1–12 were therefore dissolved in dimethyl formamide and then mixed with the bath (containing 1,1,1,-trichloroethane, methyl ethyl ketone and APO). The results are summarized in Table 1.

The following tests were employed:

(1) Bursting strength.—The bursting strength of paper is defined as the hydrostatic pressure (in pounds per square inch) required to rupture the material when pressure is applied at a controlled increasing rate through a rubber diaphragm to a circular area of material 1.20 inches in diameter. The test is designated as TAPPI Standard T403 m–53. Both wet and dry burst strength are measured. Wet strength is determined using a paper specimen which has been soaked in deionized water for 24 hours at room temperature. Burst factors are calculated to correct for the basis weight of each sheet to the standard TAPPI ream of 70.3 grams per square meter.

(2) Sizing.—This test measures the time (in seconds) required to establish a flow of a given quantity of electricity through a paper specimen placed between a lower, zinc electrode and an upper porous, water-soaked, bronze electrode.

(3) Tensile breaking length.—This is the calculated length (in meters) required for a strip of paper to break under its own weight. TAPPI Standard T404 os–61 (for ½ inch width).

Definition of terms used in Tables 1–5:

Burst factors (1) Burst Factor (Dry Burst Factor=DBF, Wet Burst Factor=WBF)=

$$\frac{70.3 \times \text{Burst Test}}{\text{Actual Basis Weight in g./m.}^2}$$

(2) Percent Dry Increase=

$$\frac{DBF - DBF \text{ of Control}}{DBF \text{ of Control}} \times 100$$

(3) Wet/Dry Control Percent=

$$\frac{WBF}{DBF \text{ of Control}} \times 100$$

(4) Percent Wet/Dry=

$$\frac{WBF}{DBF} \times 100$$

Tensile breaking length (5) Tensile Breaking Length (Dry Breaking Length=DBL, Wet Breaking Length=WBL)=

$$\frac{35716 \times \text{Tensile Test (0.5" strip)}}{\text{Actual Basis Weight in g./m.}^2}$$

(6) Percent Dry Increase=

$$\frac{DBL - DBL \text{ of Control}}{DBL \text{ of Control}} \times 100$$

(7) Wet/Dry Control Percent=

$$\frac{WBL}{DBL \text{ of Control}} \times 100$$

(8) Percent Wet/Dry Length=

$$\frac{WBL}{DBL} \times 100$$

In this application, the symbol

is meant to represent an unsubstituted aziridinyl group

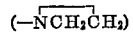

TABLE 1

| Run No. | APO Treating Concentration | Catalyst Used | Percent $BF_3$ in Treating Solution | Percent APO Retained by Analysis [1] | Temp. of Cure, °C. | Burst Strength Percent Dry Increase | Burst Strength Wet/Dry Control, Percent | Tensile Breaking Length Percent Dry Increase | Tensile Breaking Length Wet/Dry Control, Percent |
|---|---|---|---|---|---|---|---|---|---|
| 1 | 2.0 | $BF_3 \cdot MEA$ | .18 | 1.76 | 90 | | 5.7 | | 7.8 |
| 2 | 4.0 | $BF_3 \cdot MEA$ | .36 | 2.37 | 90 | | 10.1 | | 16.1 |
| 3 | 2.0 | $BF_3 \cdot MDA$ | .18 | 1.23 | 90 | | 13.2 | | 16.0 |
| 4 | 4.0 | $BF_3 \cdot MDA$ | .36 | 2.68 | 90 | | 36.9 | | 35.3 |
| 5 | 2.0 | $BF_3 \cdot DEAPA$ | .18 | 1.13 | 90 | | 6.6 | | 8.5 |
| 6 | 4.0 | $BF_3 \cdot DEAPA$ | .36 | 2.97 | 90 | | 8.1 | | 17.0 |
| 7 | 2.0 | $BF_3 \cdot MEA$ | .18 | 1.46 | 120 | | 10.0 | | 13.0 |
| 8 | 4.0 | $BF_3 \cdot MEA$ | .36 | 2.07 | 120 | | 14.8 | | 19.1 |
| 9 | 2.0 | $BF_3 \cdot MDA$ | .18 | 1.61 | 120 | | 20.6 | | 20.3 |
| 10 | 4.0 | $BF_3 \cdot MDA$ | .36 | 2.91 | 120 | | 45.0 | | 36.0 |
| 11 | 2.0 | $BF_3 \cdot DEAPA$ | .18 | 1.77 | 120 | | 7.1 | | 9.3 |
| 12 | 4.0 | $BF_3 \cdot DEAPA$ | .36 | 3.89 | 120 | | 12.6 | | 16.2 |
| Control | | | | | | (46.00) | 5.2 | (6296) | 0 |
| Control | | | | | | (42.64) | 5.2 | (6133) | 0 |

[1] Percent APO retained was calculated on the basis of nitrogen ratio present in the treating solution. Percentage is by weight based upon the dry weight of the paper. Figures in parentheses are actual values for the controls. (Dry burst factors and breaking length in meters.)

NOTE.—$BF_3 \cdot MEA = BF_3 \cdot CH_3CH_2NH_2$

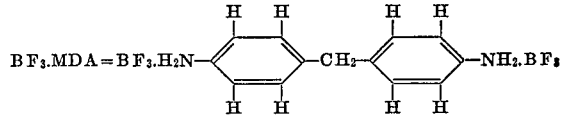

Example II

Preformed handsheets of Weyerhaeuser regular bleached kraft pulp (approximately 400 milliliters Canadian Standard Freeness) were treated by dipping in solvents containing APO and catalysts. The $BF_3 \cdot$amine catalysts were prepared in methyl alcohol as stock solutions and the APO was prepared in 1,1,1-trichloroethane as a 16 percent by weight stock solution. Treating baths were prepared on the basis of the final density of the mixture of 1,1,1-trichloroethane and methyl alcohol, proper dilution being made to give a 15 percent by weight concentration of $BF_3 \cdot$amine complex based upon the total weight of APO in the treating bath.

Cure temperatures and times were varied in a series of experiments. The temperature of each sheet was followed by means of a fine wire thermocouple and recording instrument. The curing step was carried out by placing the impregnated sheet (after evaporation of the solvent) on a highly polished caul. The other surface was against a blotter and felt pad. This assembly, felt side down, was placed on a cold lower platen of a press and then raised against the hot upper platen. The thermocouple was inserted between the caul and the sheet. The results are recorded in Tables 2 and 3.

Example III

Handsheets of Abitibi spruce kraft were treated with a bath of 1,1,1-trichloroethane and methyl ethyl ketone (volume ratio of 3:1, respectively) containing APO and $BF_3 \cdot$amine complexes in varying concentration ranges. The concentrations of the catalysts were chosen so as to give equivalent amounts of $BF_3$ for purposes of comparison. The impregnated sheets were cured for 4 minutes at 190° C. The results are summarized in Table 4. The data shows that

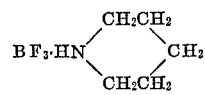

gives results comparable to $BF_3 \cdot$alkylamine complexes

TABLE 4

| Run No. | Percent (Wt.) APO in Treating Bath | Catalyst | Percent (Wt.) $BF_3 \cdot$Amine in Treating Bath | Burst, Percent Wet/Dry Control |
|---|---|---|---|---|
| 1 | 2.0 | None | 0 | 56.43 |
| 2 | 2.0 | $BF_3 \cdot$MEA | .30 | 58.95 |
| 3 | 2.0 | $BF_3 \cdot$MEA | .50 | 63.24 |
| 4 | 2.0 | $BF_3 \cdot$Piperidine | .677 | 64.28 |

Example IV

Preformed handsheets of Weyerhaeuser (bleached) kraft and Weyerhaeuser unbleached Douglas fir kraft were treated with baths containing APO. Incorporated into the bath liquids (a 3:1 volume mixture of 1,1,1-trichloroethane and methyl ethyl ketone, respectively) in addition to APO were $BF_3 \cdot N(CH_2CH_2OH)_3$ ($BF_3 \cdot$TEA) and $BF_3 \cdot$hexamethylenetetramine ($BF_3 \cdot$HMT) complexes. The results are summarized in Table 5. In each run in Table 5, the concentration of the tris(1-aziridinyl) phosphine oxide (APO) in the treating bath was 4.0 percent based on the total weight of the treating bath.

TABLE 2

[$BF_3 \cdot$Monoethylamine as Catalyst [Percent Weight Concentration in Treating Bath=15 Percent on Concentration of APO in Treating Bath] (i.e., for Every Gram of APO There is .15 Gram of $BF_3 \cdot$Monoethylamine)]

| | APO | | Cure Conditions | | Burst Strength | | Tensile Breaking Length | |
|---|---|---|---|---|---|---|---|---|
| Run No. | In Soln., Percent | On Sheet by Analysis, Percent | Temp. (° C.) | Time (Mins.) | Wet/Dry Control, Percent | Percent Wet/Dry | Wet/Dry Control, Percent | Percent Wet/Dry |
| 1 | 2.0 | 2.07 | 80 | 8 | 49.3 | 46.7 | 34.3 | 29.3 |
| 2 | 2.0 | 1.72 | 90 | 4 | 50.5 | 52.6 | 31.0 | 28.5 |
| 3 | 2.0 | 2.30 | 110 | 4 | 52.5 | 50.4 | 35.8 | 33.3 |
| 4 | 2.0 | 2.18 | 120 | 2 | 54.5 | 51.1 | 37.5 | 31.7 |
| 5 | 4.0 | 3.10 | 80 | 8 | 53.8 | 48.1 | 40.0 | 32.8 |
| 6 | 4.0 | 3.41 | 100 | 6 | 57.4 | 53.4 | 39.6 | 36.8 |
| 7 | 4.0 | 3.14 | 120 | 2 | 61.1 | 61.9 | 45.3 | 38.7 |

TABLE 3

[$BF_3 \cdot$p,p'-Methylenedianiline as Catalyst [Percent Concentration in Treating Bath=10.18 Percent on Percent Concentration of APO in Treating Bath] (i.e., for Every Gram of APO There is .1018 Gram of $BF_3 \cdot$p,p'-Methylenedianiline)]

| | APO | | Cure Conditions | | Burst Strength | | Tensile Breaking Length | |
|---|---|---|---|---|---|---|---|---|
| Run No. | In Soln., Percent | On Sheet by Analysis, Percent | Temp. (° C.) | Time (Mins.) | Wet/Dry Control, Percent | Percent Wet/Dry | Control, Wet Dry Percent | Percent Wet Dry |
| 8 | 2.0 | 1.92 | 80 | 6 | 54.9 | 59.9 | 39.3 | 36.2 |
| 9 | 2.0 | 1.84 | 90 | 2 | 58.8 | 51.2 | 43.5 | 37.5 |
| 10 | 2.0 | 1.88 | 100 | 4 | 62.3 | 68.9 | 44.0 | 41.7 |
| 11 | 2.0 | 2.56 | 110 | 2 | 58.1 | 57.9 | 41.0 | 38.2 |
| 12 | 2.0 | 2.03 | 110 | 8 | 60.3 | 53.8 | 44.1 | 38.3 |
| 13 | 2.0 | 1.76 | 120 | 2 | 67.5 | 66.9 | 45.6 | 39.2 |
| 14 | 4.0 | 3.49 | 80 | 8 | 76.3 | 70.7 | 51.4 | 43.8 |
| 15 | 4.0 | 2.76 | 100 | 6 | 79.8 | 71.3 | 53.3 | 44.9 |
| 16 | 4.0 | 2.56 | 120 | 4 | 80.2 | 77.5 | 64.1 | 54.5 |

TABLE 5

| Run No. | Type of Paper | Catalyst | Curing Temp. (° C.) | Percent (Wt.) of Catalyst in Treating Bath | Burst Strength Percent Wet/Dry Control | Tensile Breaking Length Percent Wet/Dry Control |
|---|---|---|---|---|---|---|
| 1 | Bleached kraft | $BF_3 \cdot$TEA | 120 | 1.15 | 61.7 | 44.5 |
| | do | $BF_3 \cdot$HMT | 120 | 0.73 | 64.0 | 44.3 |
| 2 | Unbleached Douglas fir kraft | $BF_3 \cdot$TEA | 120 | 1.15 | 61.5 | 45.0 |
| | do | $BF_3 \cdot$HMT | 120 | 0.73 | 55.3 | 41.6 |
| 3 | Bleached kraft | $BF_3 \cdot$TEA | 150 | 1.15 | 65.0 | 51.4 |
| | do | $BF_3 \cdot$HMT | 150 | 0.73 | 58.1 | 50.8 |
| 4 | Unbleached Douglas fir kraft | $BF_3 \cdot$TEA | 150 | 1.15 | 67.5 | 56.5 |
| | do | $BF_3 \cdot$HMT | 150 | 0.73 | 57.2 | 50.7 |

Example V

The following runs were carried out in a manner similar to that shown in the preceding examples. Chromatography paper (Whatman No. 1) was cut into sheets 4½ by 6½ inches and dipped in a 35 milliliter treating bath containing 2 percent by weight of an aziridine derivative test compound. The liquid portion of the bath was a 50:50 (volume) mixture of xylene and methyl ethyl ketone. Some of the treating baths also contained .30 percent (weight) of $BF_3 \cdot CH_3CH_2NH_2$ catalyst to compare the effect with catalyst and without catalyst. The dried impregnated paper samples were cured at temperatures of 120° C. and 190° C. for a 4 minute time period. The properties of the treated and untreated paper were compared. The results are summarized in Table 6.

In this work the percent dry burst is defined as the difference in the burst in p.s.i. of the treated specimen and the control specimen divided by the burst in p.s.i. of the control specimen $\times 100$. No correction has been made for basis weight.

The wet burst is the actual burst in p.s.i. recorded after 24 hours' soak in deionized water. The untreated control specimens have essentially 0 p.s.i. burst strength.

TABLE 6

| Run Number | Compound | Percent Dry Burst Without Catalyst | Percent Dry Burst With $BF_3$·MEA Catalyst | Wet Burst Without Catalyst | Wet Burst With $BF_3$·MEA Catalyst | Sizing Without Catalyst | Sizing With $BF_3$·MEA Catalyst |
|---|---|---|---|---|---|---|---|
| 1 | $R-NH-\overset{O}{\underset{\|}{C}}-N\triangleleft$ | | | | | | |
| | $R = $ phenyl | | | | | 9.0 / 137.4 | 162.8 / 323.2 |
| | $R = CH_3$-phenyl- | | | | | 7.4 / 4.8 | 76.4 / 294.4 |
| | $R = CH_3$-phenyl- (Cl) | | | | | 7.6 / 10.9 | 484.4 / 478.5 |
| | $R = $ (CH_3-phenyl) | | | | | 6.2 / 81.6 | 40.6 / 268.6 |
| 2 | $\triangleright N-\overset{O}{\underset{\|}{C}}-\overset{H}{\underset{\|}{N}}-R-\overset{H}{\underset{\|}{N}}-\overset{O}{\underset{\|}{C}}-N\triangleleft$ | | | | | | |
| | $R = -(CH_2)_6-$ | 19.9 / 14.0 | 22.8 / 21.0 | 6.4 / 9.6 | 9.2 / 9.8 | | |
| | $R = $ phenyl-CH_3 | | | 2.7 / 6.6 | 5.7 / 6.8 | | |
| | $R = C_2H_4$ | 12.6 / 18.5 | 21.5 / 38.5 | 8.2 / 8.2 | 11.4 / 12.9 | | |
| 3 | $\overset{H\ CH_3}{\underset{H_2}{\triangleright N}}-\overset{O}{\underset{\|}{C}}-\overset{H}{\underset{\|}{N}}-R-\overset{H}{\underset{\|}{N}}-\overset{O}{\underset{\|}{C}}-\overset{CH_3\ H}{\underset{H_2}{N\triangleleft}}$ | | | | | | |
| | $R = -(CH_2)_6-$ | 4.3 / 40.7 | 34.3 / 62.8 | | | | |
| | $R = $ phenyl-CH_2-phenyl | 22.8 / 30.7 | 32.8 / 42.1 | | | | |
| 4 | $\triangleright N-\overset{O}{\underset{\|}{C}}-\text{phenyl}-\overset{O}{\underset{\|}{C}}-N\triangleleft$ | | | 1.4 / 7.4 | 3.2 / 9.6 | | |
| 5 | $R-\overset{O}{\underset{\|}{\underset{N\triangleleft}{P}}}-N\triangleleft$ | | | | | | |
| | $R = C_2H_5O-$ | -4.3 / 17.1 | 35.0 / 51.4 | 2.0 / 5.3 | 10.3 / 12.2 | | |
| | $R = CH_3CH_2CH_2CH_2-O-$ | | | 0.9 / 3.2 | 2.8 / 6.3 | | |
| | $R = $ phenyl-O- | | | 1.2 / 4.6 | 2.0 / 8.4 | | |
| | $R = $ phenyl-$\overset{H}{\underset{\|}{N}}-$ | -5.2 / 23.0 | 20.7 / 71.1 | 1.0 / 6.4 | 4.5 / 14.4 | | |

Table 6—Continued

| Run Number | Compound | Percent Dry Burst Without Catalyst | Percent Dry Burst With BF₃·MEA Catalyst | Wet Burst Without Catalyst | Wet Burst With BF₃·MEA Catalyst | Sizing Without Catalyst | Sizing With BF₃·MEA Catalyst |
|---|---|---|---|---|---|---|---|
| | R=CH₃—N(H)— | 0.0<br>27.4 | 27.4<br>43.7 | 3.0<br>11.2 | 9.5<br>13.1 | | |
| 6 | 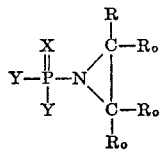 | | | | | | |
| | R=C₆H₄—N(H)— | | | 1.0<br>1.9 | 2.0<br>8.2 | | |
| 7 | 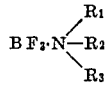 | | | | | | |
| | 50 Percent mixture of—<br>(R=C₃H₇O— and R=C₃H₇S—) | | | 1.2<br>6.0 | 3.0<br>7.9 | | |
| | R=—N< | | | 1.4<br>5.6 | 10.7<br>7.4 | | |
| 8 | 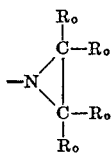 | 1.4<br>17.1 | 8.6<br>21.4 | | | | |
| 9 | 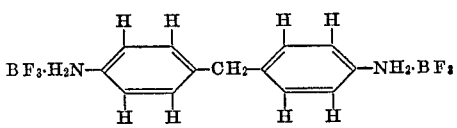 | | | | | 1.1<br>2.2 | 138.4<br>110.0 |

In the foregoing examples, it is to be understood that all unsatisfied valences of the carbon atoms are bonded to hydrogen atoms.

We claim as our invention:

1. A method of paper treatment which comprises contacting paper with a substantially anhydrous mixture containing a BF₃·amine complex and a compound having the formula $$\begin{array}{c} R \\ X \quad C-R_o \\ \parallel \quad / \\ Y-P-N \\ | \quad \backslash \\ Y \quad C-R_o \\ R_o \end{array}$$

wherein:
 (a) X represents an atom of atomic number 8k where k is an integer of from 1 to 2,
 (b) each $R_o$ is independently selected from the group consisting of the phenyl group and a group of the formula $+C_mH_{2m}+H$ in which m is an integer of from 0 to 4, and
 (c) each Y is independently selected from the group consising of $$-N\begin{array}{c} C-R_o \\ | \\ R_o \\ C-R_o \\ | \\ R_o \end{array}$$

(wherein each $R_o$ is as previously defined) and an alkoxy group of from 1 to 18 carbon atoms and curing said impregnated paper at a temperature of from about 50° C. to 250° C.

2. The method of claim 1 wherein the BF₃·amine complex has the formula $$BF_3 \cdot N\begin{array}{c} R_1 \\ -R_2 \\ R_3 \end{array}$$

wherein each of $R_1$, $R_2$ and $R_3$ is a group of the formula $+C_kH_{2k}+Z_1$ in which $Z_1$ is selected from the group consisting of the hydrogen atom and a hydroxyl group, k is an integer of from 0 to 4 and $Z_1$ is hydrogen when k is 0, and not all of $R_1$, $R_2$ and $R_3$ are hydrogen atoms.

3. The method of claim 1 wherein the BF₃·amine complex is:

$$BF_3 \cdot NN\begin{array}{c} CH_2CH_2 \\ \phantom{N}CH_2 \\ CH_2CH_2 \end{array}$$

4. The method of claim 1 wherein the BF₃·amine complex is:

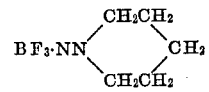

5. The method of claim 1 wherein the BF₃·amine complex is BF₃·CH₃CH₂NH₂.

6. The method of claim 1 wherein the mixture contains tris(1-aziridinyl) phosphine oxide and a BF₃·amine complex as the only curing catalyst to form an impregnated paper product, and the curing is at a temperature of from about 100 to 200° C.

7. The method of claim 1 wherein the mixture contains tridecyloxy bis(1-aziridinyl)phosphine oxide and a BF$_3$·amine complex to form an impregnated paper product and the curing is at a temperature of from about 100 to 200° C.

8. The method of claim 1 wherein the mixture contains

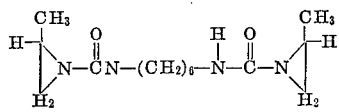

and a catalytic amount of

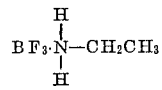

to form an impregnated paper product.

9. The method of claim 6 wherein the BF$_3$·amine complex is BF$_3$·hexamethylenetetramine.

10. The method of claim 6 wherein the BF$_3$·amine complex is BF$_3$·CH$_3$CH$_2$NH$_2$.

11. The method of claim 7 wherein the BF$_3$·amine complex is BF$_3$·H$_2$N-CH$_2$CH$_3$.

12. The method of claim 7 wherein the BF$_3$·amine complex is BF$_3$·N(CH$_2$CH$_2$OH)$_3$.

13. The method of claim 7 wherein the BF$_3$·amine complex is BF$_3$·hexamethylenetetramine.

References Cited

UNITED STATES PATENTS

| | | | |
|---|---|---|---|
| 2,859,134 | 11/1958 | Reeves et al. | 117—141 X |
| 2,870,042 | 1/1959 | Chance et al. | 117—136 |
| 2,886,539 | 5/1959 | Drake et al. | |
| 2,891,877 | 6/1959 | Chance et al. | |
| 2,901,444 | 8/1959 | Chance et al. | |
| 2,917,492 | 12/1959 | Reeves et al. | 117—136 X |
| 3,034,919 | 5/1962 | Steinhauer | 117—121 X |
| 3,242,004 | 3/1966 | Kenaga | 117—136 |
| 3,312,520 | 4/1967 | Kenaga | 117—60 X |

OTHER REFERENCES

Drake, George L., Jr.: Imparting Crease Resistance and Crease Retention to Cotton With APO, Textile Research Journal, vol. XXIX, No. 2, February 1959.

WILLIAM D. MARTIN, *Primary Examiner.*

M. LUSIGNAN, *Assistant Examiner.*

U.S. Cl. X.R.

117—137, 161; 260—2